(12) United States Patent
Chen et al.

(10) Patent No.: US 10,761,669 B2
(45) Date of Patent: Sep. 1, 2020

(54) TOUCH PANEL, METHOD FOR FABRICATING THE SAME, DISPLAY PANEL, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Jun Chen, Beijing (CN); Ming Zhang, Beijing (CN); Qicheng Chen, Beijing (CN); Yuan Li, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/408,961

(22) Filed: May 10, 2019

(65) Prior Publication Data

US 2020/0019280 A1 Jan. 16, 2020

(30) Foreign Application Priority Data

Jul. 16, 2018 (CN) .......................... 2018 1 0779123

(51) Int. Cl.
*G06F 3/044* (2006.01)

(52) U.S. Cl.
CPC .. *G06F 3/0446* (2019.05); *G06F 2203/04103* (2013.01); *G06F 2203/04111* (2013.01)

(58) Field of Classification Search
CPC ............. G06F 2203/04111; G06F 2203/04103
See application file for complete search history.

(56) References Cited

U.S. PATENT DOCUMENTS

| | | | |
|---|---|---|---|
| 2011/0227858 A1* | 9/2011 | An | G06F 3/044 345/174 |
| 2014/0320761 A1* | 10/2014 | Misaki | G06F 3/044 349/12 |
| 2016/0109741 A1* | 4/2016 | Lee | G06F 3/0412 349/12 |
| 2016/0291790 A1* | 10/2016 | Yao | G06F 3/0418 |
| 2019/0056816 A1* | 2/2019 | Hsu | G06F 3/044 |

* cited by examiner

*Primary Examiner* — Dong Hui Liang
(74) *Attorney, Agent, or Firm* — Arent Fox LLP; Michael Fainberg

(57) ABSTRACT

This disclosure discloses a touch panel, a method for fabricating the same, a display panel, and a display device, and the touch panel includes: a substrate; touch electrodes on the substrate, wherein the touch electrodes include a first electrode in a first direction, and a second electrode perpendicular to the first direction, and the first electrode includes a plurality of first electrode blocks; and a plurality of bridge structures on the substrate, configured to electrically connect adjacent first electrode blocks of the plurality of first electrode blocks, wherein each of the plurality of bridge structures includes: at least two metal bridge points, and an electrode connection bridge and a first protection layer overlying the at least two metal bridge points successively, wherein the electrode connection bridge includes via holes corresponding to the metal bridge points in a one-to-one manner.

18 Claims, 5 Drawing Sheets

TOUCH PANEL, METHOD FOR FABRICATING THE SAME, DISPLAY PANEL, AND DISPLAY DEVICE

CROSS-REFERENCE TO RELATED APPLICATION

This application claims the benefit of Chinese Patent Application No. 201810779123.8, filed with the Chinese Patent Office on Jul. 16, 2018, the content of which is hereby incorporated by reference in its entirety.

FIELD

This disclosure relates to the field of display technologies, and particularly to a touch panel, a method for fabricating the same, a display panel, and a display device.

BACKGROUND

A touch panel includes metal wires, electrode connection bridges, a connection bridge protection layer, touch electrodes, a touch electrode protection layer, etc.

SUMMARY

Embodiments of the disclosure disclose a touch panel, a method for fabricating the same, a display panel, and a display device.

In order to attain this object, the embodiments of the disclosure provide the following technical solutions.

An embodiment of the disclosure provides a touch panel including:

a substrate;

touch electrodes on the substrate, wherein the touch electrodes include a first electrode in a first direction, and a second electrode perpendicular to the first direction, and the first electrode includes a plurality of first electrode blocks; and a plurality of bridge structures, on the substrate, configured to electrically connect adjacent first electrode blocks of the plurality of first electrode blocks, wherein each of the plurality of bridge structures includes: at least two metal bridge points, and an electrode connection bridge and a first protection layer overlying the at least two metal bridge points successively, wherein the electrode connection bridge includes via holes corresponding to the metal bridge points in a one-to-one manner, and the pattern of an orthographic projection of the first protection layer on the substrate has the same shape as a pattern of an orthographic projection of the electrode connection bridge on the substrate; and two of the plurality of first electrode blocks respectively at two ends of each electrode connection bridge run respectively through the via holes of the first protection layer and the via holes of the electrode connection bridge, and are electrically connected respectively with the metal bridge points.

In the touch panel above, at least two metal bridge points are at the underlying layer of each of the plurality of bridge structures, the electrode connection bridge and the first protection layer overlie the metal bridge points successively, both the electrode connection bridge and the first protection layer are arranged with the via holes corresponding to the metal bridge points, and the two electrode blocks at the two ends of each electrode connection bridge run respectively through the via holes of the first protection layer and the via holes of the electrode connection bridge, and are electrically connected respectively with the metal bridge points; and furthermore the two electrode blocks at the two ends of each electrode connection bridge can be electrically connected with each other through the metal bridge points and the electrode connection bridge. Furthermore in this touch panel, since the pattern of the orthographic projection of the electrode connection bridge n the substrate has a same shape as the pattern of the orthographic projection of the first protection layer on the substrate, the electrode connection bridge and the first protection layer can be patterned using a same mask to thereby dispense with one mask so as to lower the cost of fabricating the touch panel.

In some embodiments, the touch panel further includes a second protection layer on the touch electrodes, and a pattern of an orthographic projection of the second protection layer on the substrate coincides with a pattern of an orthographic projection of the touch electrodes on the substrate.

In some embodiments, the touch panel further includes metal wires at a same layer as the metal bridge points.

In some embodiments, a wire electrode layer at a same layer as the touch electrodes and a wire protection layer at a same layer as the second protection layer overlie the metal wires successively.

In some embodiments, the touch panel further includes a third protection layer with a full layer structure on the second protection layer.

In some embodiments, the pattern of the orthographic projection of the first protection layer on the substrate covers the pattern of the orthographic projection of the electrode connection bridge on the substrate.

In some embodiments, a contour of an edge of the first protection layer completely covers a contour of an edge of the electrode connection bridge.

In some embodiments, the wire electrode layer and the wire protection layer each has an opening in a bonding area of the metal wires.

In some embodiments, the electrode connection bridge and the touch electrodes are Indium Tin Oxide electrodes, and the first protection layer and the second protection layer are insulating organic layers.

In some embodiments, a size of each of the via holes of the first protection layer is less than a size of each of the metal bridge points, and a size of each of the via holes of the electrode connection bridge is less than the size of each of the metal bridge points.

The embodiments of the disclosure provide a display panel including the touch panel according to any one of the embodiments above.

The embodiments of the disclosure provide a display device including the display panel according to the embodiments above.

The embodiments of the disclosure provide a method for fabricating the touch panel according to any one of the embodiments above, the method including:

forming a metal layer on the substrate, and forming the metal bridge points of each of the plurality of bridge structures in a first patterning process;

forming a first electrode layer on the metal layer, and forming the electrode connection bridge of each of the plurality of bridge structures in a second patterning process;

forming a first organic insulating layer on the first electrode layer, and forming the first protection layer of each of the plurality of bridge structures in a third patterning process, wherein a same mask is used in the third patterning process and the second patterning process; and forming the touch electrodes on the first organic insulating layer.

In some embodiments, the forming the touch electrodes on the first organic insulating layer includes:

forming a second electrode layer on the first organic insulating layer, forming a second organic insulating layer on the second electrode layer, and patterning the second organic insulating layer in a fourth patterning process to form a same pattern as the touch electrodes to be formed; and etching the second electrode layer using the second organic insulating layer as a mask to form the touch electrodes.

In some embodiments, metal wires are further formed in the first patterning process.

In some embodiments, the method further includes:

forming a wire protection layer overlying the metal wires in the fourth patterning process; and etching the second electrode layer using the second organic insulating layer as a mask to further form a wire electrode layer overlying the metal wires.

In some embodiments, patterning the second organic insulating layer in a fourth patterning process to form a same pattern as the touch electrodes to be formed includes:

patterning the second organic insulating layer in a fourth patterning process to form a same pattern as the touch electrodes to be formed to thereby form a second protection layer;

wherein etching the second electrode layer using the second organic insulating layer as a mask to form the touch electrodes includes:

etching the second electrode layer using the second protection layer as a mask to form the touch electrodes.

In some embodiments, after forming the touch electrodes on the first organic insulating layer, the method further includes: forming a third protection layer with a full layer structure on the second protection layer.

DETAILED DESCRIPTION OF THE EMBODIMENTS

Figure 1:
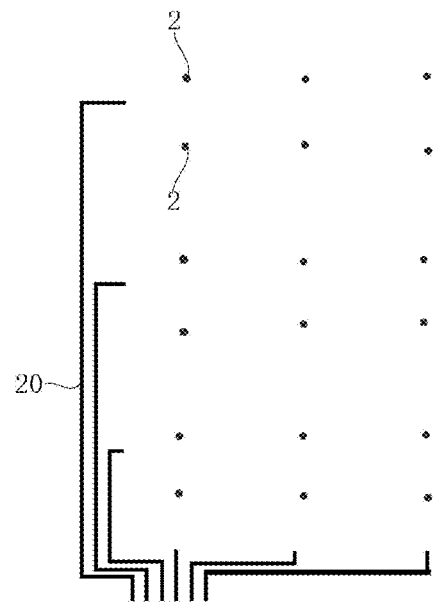
FIG. 1 is a schematic structural diagram of metal bridge points and metal wires in a touch panel according to the embodiments of the disclosure.

The touch panel is usually fabricated by patterning a metal layer, a first electrode layer (e.g. a first Indium Tin Oxide layer, ITO1), a first protection layer (e.g. a first overcoat layer, OC1), a second electrode layer (e.g. a second Indium Tin Oxide layer, ITO2), and a second protection layer (e.g. a second overcoat layer, OC2) respectively using five masks at a high development cost.

The technical solutions according to the embodiments of the disclosure will be described below clearly and fully with reference to the drawings in the embodiments of the disclosure. Apparently the embodiments to be described are only a part but all of the embodiments of the disclosure. Based upon the embodiments here of the disclosure, all of other embodiments which can occur to those ordinarily skilled in the art without any inventive effort shall come into the scope of the disclosure as claimed.

Reference will be made to FIG. 1 to FIG. 15.

As illustrated in FIG. 1 to FIG. 5, a touch panel according to the embodiments of the disclosure includes:

a substrate 1;

touch electrodes on the substrate 1, where the touch electrodes include a first electrode 51 in a first direction (as indicated by the dotted arrow in FIG. 3) and a second electrode 52 perpendicular to the first direction, and the first electrode 51 includes a plurality of first electrode blocks 510 in the first direction; and a plurality of bridge structures on the substrate 1, configured to electrically connect adjacent first electrode blocks 510 of the plurality of first electrode blocks 510, where of the plurality of bridge structures includes: at least two metal bridge points 2, and an electrode connection bridge 3 and a first protection layer 4 overlying the at least two metal bridge points 2 successively, where the electrode connection bridge 3 includes via holes corresponding to the metal bridge points 2 in a one-to-one manner, and a pattern of an orthographic projection of the first protection layer 4 on the substrate 1 has a same shape as a pattern of an orthographic projection of the electrode connection bridge 3 on the substrate 1; and two of the plurality of first electrode blocks 510 respectively at two ends of each electrode connection bridge 3 run respectively through via holes of the first protection layer 4 and the via holes of the electrode connection bridge 3, and are electrically connected respectively with the metal bridge points 2. In some embodiments, for example, each of the plurality of bridge structures includes two metal bridge points 2, which can correspond respectively to the two ends of the electrode connection bridge 3, and the two first electrode blocks 510 at the two ends of the electrode connection bridge 3 can run respectively through two via holes of the first protection layer 4, and the corresponding two via holes of the electrode connection bridge 3, and be electrically connected respectively with the two metal bridge points 2.

In the touch panel above, at least two metal bridge points 2 are arranged at the underlying layer of each of the plurality of bridge structures, the electrode connection bridge 3 and the first protection layer 4 overlie the metal bridge points 2 successively, both the electrode connection bridge 3 and the first protection layer 4 are arranged with the via holes corresponding to the metal bridge points 2, and the two electrode blocks 510 at the two ends of each electrode connection bridge 3 run respectively through the via holes of the first protection layer 4 and the via holes of the electrode connection bridge 3, and are electrically connected respectively with the metal bridge points; and furthermore the two electrode blocks 510 at the two ends of each electrode connection bridge 3 can be electrically connected with each other through the metal bridge points 2 and the electrode connection bridge 3. Furthermore in this touch panel, since the pattern of the orthographic projection of the electrode connection bridge 3 on the substrate has a same shape as the pattern of the orthographic projection of the first protection layer 4 on the substrate 1, the electrode connection bridge 3 and the first protection layer 4 can be patterned using a same mask to thereby dispense with one mask so as to lower the cost of fabricating the touch panel.

Figure 4:
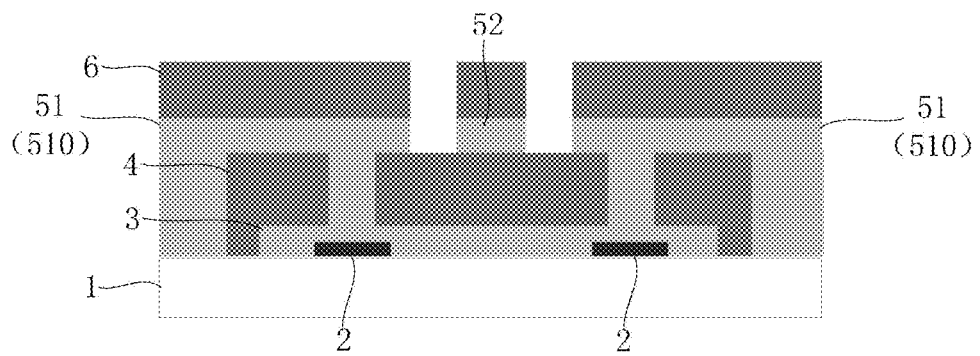
FIG. 4 is a schematic structural diagram of the touch panel in FIG. 3 in a sectional view along A-A.
Figure 5:
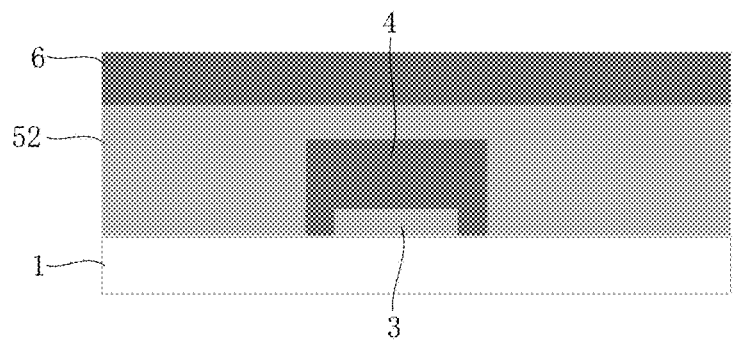
FIG. 5 is a schematic structural diagram of the touch panel in FIG. 3 in a sectional view along B-B.

As illustrated in FIG. 4 and FIG. 5, in some embodiments, the pattern of the orthographic projection of the first protection layer 4 on the substrate 1 covers the pattern of the orthographic projection of the electrode connection bridge 3 on the substrate 1, that is, a contour of an edge of the first protection layer 4 completely covers a contour of an edge of the electrode connection bridge 3, so that the electrode connection bridge 3 is completely insulated from the second electrode 52.

A shape of the pattern of the first protection layer 4 is the same as a shape of the pattern of the electrode connection bridge 3, and the contour of the edge of the first protection layer 4 completely covers the contour of the edge of the electrode connection bridge 3; and furthermore when the first protection layer 4 and the electrode connection bridge 3 are patterned respectively using a same mask, a size of the resulting contour of the edge of the first protection layer 4 and a size of the resulting contour of the edge of the electrode connection bridge 3 can be controlled by controlling the amount of exposure so that the contour of the edge of the electrode connection bridge 3 is completely covered by the contour of the edge of the first protection layer 4.

As illustrated in FIG. 4 and FIG. 5, in some embodiments, the touch panel according to the embodiments of the disclosure further includes a second protection layer 6 on the touch electrodes, and a pattern of an orthographic projection of the second protection layer 6 on the substrate 1 coincides with a pattern of the orthographic projection of the touch electrodes on the substrate 1. In some embodiments, the touch electrode layer can be etched using the second protection layer 6 as a mask to thereby form touch electrode structures, so that as compared with the fabricating process in the related art, the touch panel according to the embodiments of the disclosure can be fabricated while dispensing with one further mask, and also dispensing with the processes of coating, exposing, etching, and stripping photo-resist (PR) on the touch electrode layer, and thus avoiding the touch electrodes from being peeled in those processes.

Furthermore the touch panel according to the embodiments of the disclosure further includes a third protection layer on the second protection layer 6, and the third protection layer has a full layer structure, and can isolate the touch electrodes completely from the air to thereby avoid the touch electrodes from being oxidized.

Figure 2:
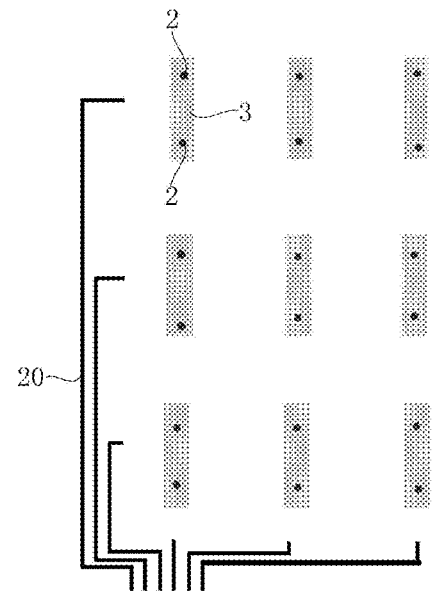
FIG. 2 is a schematic structural diagram of the metal bridge points, the metal wires, and electrode connection bridges in the touch panel according to the embodiments of the disclosure.
Figure 3:
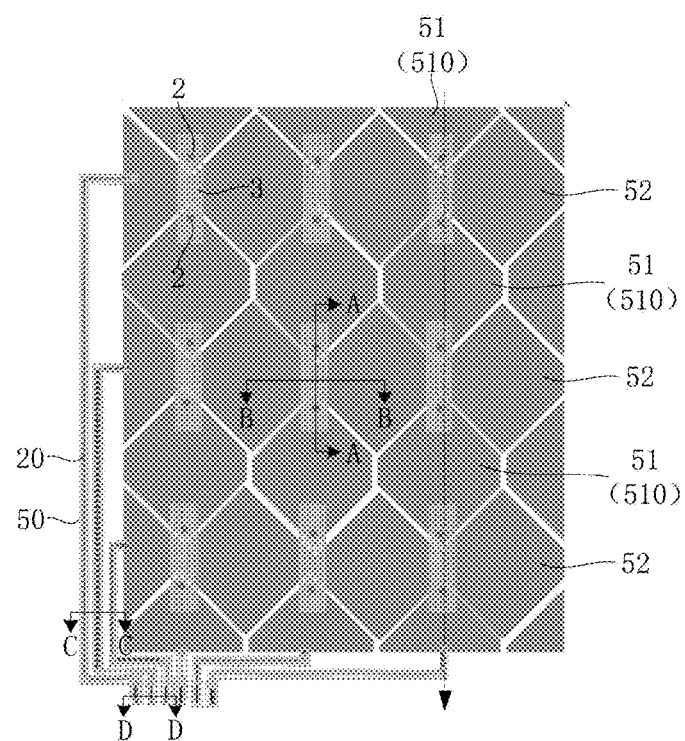
FIG. 3 is a schematic structural diagram of a touch panel according to an embodiments of the disclosure.

As illustrated in FIG. 1 to FIG. 3, optionally in order to guarantee a visual effect of the appearance of the touch panel, the metal bridge points 2 are preferably as small as possible; and in some embodiments, the metal bridge points 2 can be circles with a diameter ranging from 10 μm to 15 μm.

Furthermore optionally in order to guarantee circuit connection, a size of a via hole of the first protection layer 4 and a size of a via hole of the electrode connection bridge 3 are less than a size of the metal bridge point 2, and in some embodiments, the via holes of the first protection layer 4 and the electrode connection bridge 3 can be circular holes with a diameter ranging from 5 μm to 10 μm.

As illustrated in FIG. 1 to FIG. 3, in some embodiments, the touch panel according to the embodiments of the disclosure further includes metal wires 20 at the same layer as the metal bridge points 2. In some embodiments, the metal bridge points 2 and the metal wires 20 can be formed in one patterning process without any additional mask and additional process step.

Figure 6:
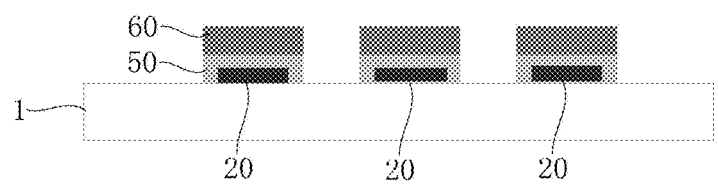
FIG. 6 is a schematic structural diagram of the touch panel in FIG. 3 in a sectional view along C-C.

As illustrated in FIG. 6, in some optional embodiments, a wire electrode layer 50 at the same layer as the touch electrodes, and a wire protection layer 60 at the same layer as the second protection layer 6 overlie the metal wires 20 successively. The wire electrode layer 50 and the wire protection layer 60 can protect the metal wires 20 from being eroded, oxidized, etc., after being exposed to the air for a long period of time.

Figure 7:
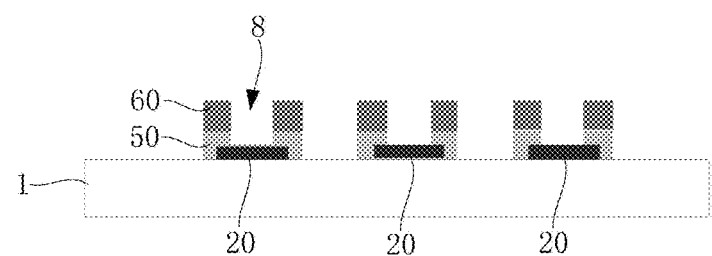
FIG. 7 is a schematic structural diagram of the touch panel in FIG. 3 in a sectional view along D-D.

Furthermore optionally as illustrated in FIG. 7, the wire electrode layer 50 and the wire protection layer 60 each has an openings 8 in a bonding area of the metal wires 20 to thereby expose the metal wires 20 in the bonding area, thus facilitating circuit connection in the bonding area.

In an some optional embodiments, the wire electrode layer 50 and the touch electrodes 5 are formed in one etching process, and the wire protection layer 60 and the second protection layer 6 are formed in one patterning process, without any additional mask and additional process step.

As illustrated in FIG. 2 to FIG. 5, in some embodiments, both the electrode connection bridge 3 and the touch electrodes 5 are transparent electrodes, and can particularly be ITO electrodes; and both the first protection layer 4 and the second protection layer 6 can be insulating organic layers, can insulate and protect the ITO electrodes, can be formed in a specific pattern in a patterning process, and will not be stripped.

The touch panel according to the embodiments of the disclosure can be fabricated in such a way that the electrode connection bridges 3 and the first protection layer can be patterned using a same mask, and the touch electrode layer is etched directly using the pattern of the second protection layer 6 as a mask to form the touch electrodes, so the touch panel can be fabricated while dispensing with at least two masks to thereby greatly lower the development cost, and also dispensing with the processes of coating, exposing, etching, and stripping the photo-resist (PR) on the touch electrode layer to thereby simplify the fabrication process, and thus avoiding the touch electrodes from being peeled, to thereby improve the good-yield ratio of the display panel.

The embodiments of the disclosure further provide a display panel including the touch panel according to any one of the embodiments above.

The embodiments of the disclosure further provide a display device including the display panel according to the embodiments above.

Figure 15:
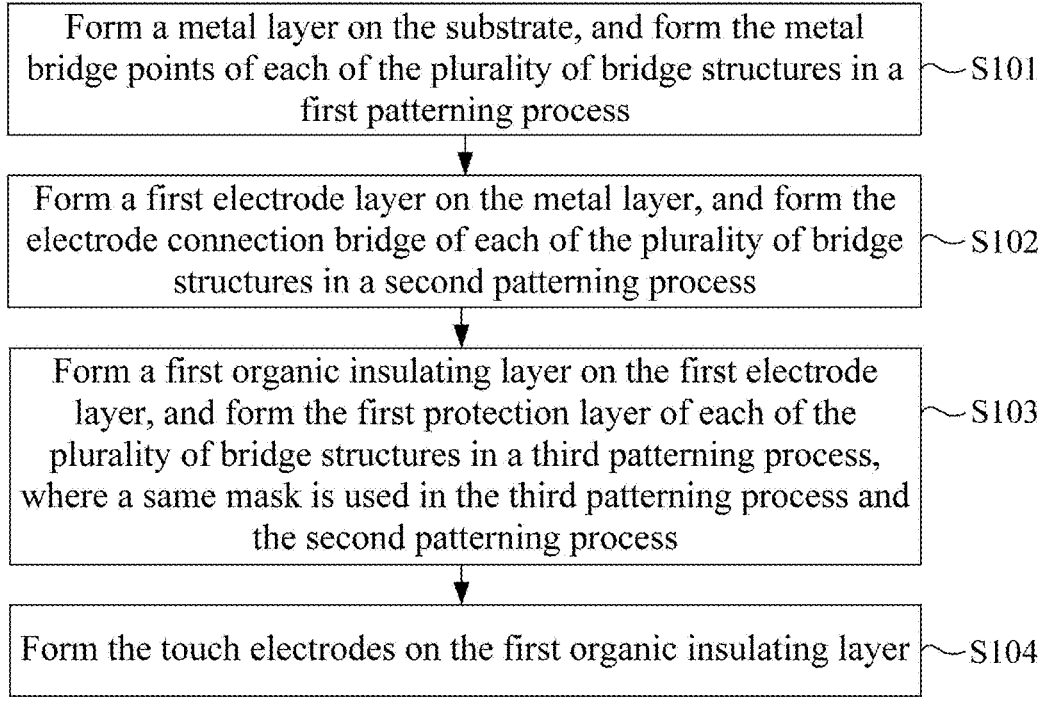
FIG. 15 is a flow chart of a method for fabricating the touch panel according to the embodiments of the disclosure.

Further to the touch panel according to the embodiments above, the embodiments of the disclosure further provide a method for fabricating the touch panel, and as illustrated in FIG. 15, the method includes the following steps.

Figure 8:
FIG. 8 is a schematic structural diagram of a part of the touch panel in a sectional view according to the embodiments of the disclosure after the metal bridge points are formed.

Step S101, forming a metal layer on the substrate 1, and forming the metal bridge points 2 of each of the plurality of bridge structures in a first patterning process, as illustrated in FIG. 8. In the embodiments of the disclosure, the "patterning process" refers to process steps of forming a structure in a specific pattern, and can include one or more of process steps of coating, exposing, developing, etching, and striping photo-resist, or can be an imprinting process, an ink-jet printing process, or another patterning process of forming a structure in a desirable pattern using a mask in the art.

Figure 9:
FIG. 9 is a schematic structural diagram of a part of the touch panel in a sectional view according to the embodiments of the disclosure after a first electrode layer is formed.
Figure 10:
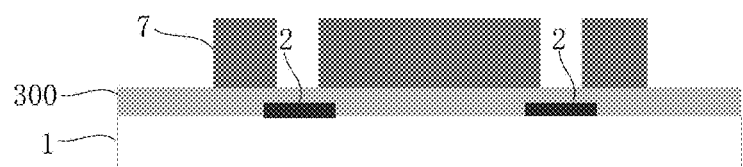
FIG. 10 is a schematic structural diagram of a part of the touch panel in a sectional view according to the embodiments of the disclosure after a photo-resist layer is formed on the first electrode layer.
Figure 11:
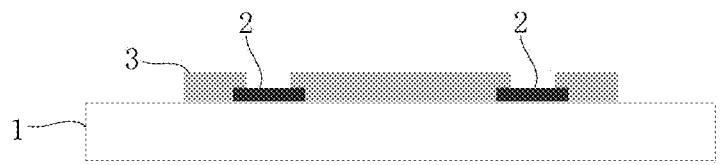
FIG. 11 is a schematic structural diagram of a part of the touch panel in a sectional view according to the embodiments of the disclosure after the metal connection bridges are formed.

Step S102, forming a first electrode layer 300 on the metal layer, and forming the electrode connection bridge 3 of each of the plurality of bridge structures in a second patterning process, as illustrated in FIG. 9 to FIG. 11.

Figure 12:
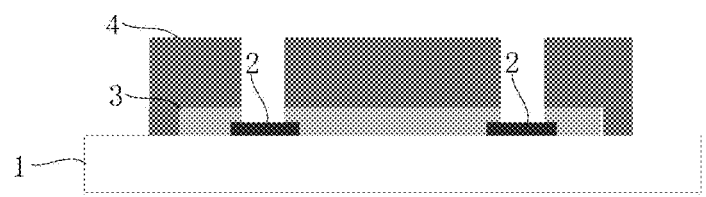
FIG. 12 is a schematic structural diagram of a part of the touch panel in a sectional view according to the embodiments of the disclosure after a first protection layer is formed.

Step S103, forming a first organic insulating layer on the first electrode layer, and forming the first protection layer 4 of each of the plurality of bridge structures in a third patterning process, as illustrated in FIG. 12. In some embodiments, a mask of the third patterning process is the same as a mask of the second patterning process.

Step S104, forming the touch electrodes on the first organic insulating layer.

In the method for fabricating a touch panel according to the embodiments of the disclosure, the electrode connection bridge 3 and the first protection layer 4 are patterned using a same ask so that one mask can be dispensed with to thereby lower the fabrication cost of the touch panel.

In some embodiments, the metal wires 20 can be further formed in the first patterning process in the step S101, that is, the metal layer is patterned in one patterning process in the step S101 to form the metal bridge points 2 in a touch area and the metal lines 20 around the touch area, as illustrated in FIG. 1.

In some embodiments, the flow of the step S102 can include: forming an integral first electrode layer (ITO layer) 300 on the substrate 1 formed with the metal bridge points 2 as illustrated in FIG. 9, and then coating, exposing, and developing photo-resist (PR) on the ITO layer 300 to form a photo-resist layer 7 with a same pattern of the electrode connection bridges 3, as illustrated in FIG. 10; and then etching the ITO layer 300 to reserve the ITO layer in a protected area of the photo-resist layer 7, and to remove the ITO layer in the other area to thereby form the electrode connection bridges 3, as illustrated in FIG. 11. In some embodiments, since this is a low-temperature process, and the ITO material is amorphous, the ITO layer can be etched using weak acid, which cannot etch the underlying metal bridge points 2, so that the metal bridge points 2 at the openings of the pattern of the photo-resist layer 7 can be reserved for circuit connection between the two ends of the electrode connection bridges 3. Finally the photo-resist layer 7 on the electrode connection bridges 3 is stripped so that the electrode connection bridge 3 is formed.

In some embodiments, the flow of the step S103 can include: forming an integral organic insulating layer on the substrate 1 formed with the electrode connection bridges 3 as illustrated in FIG. 12, and then exposing and developing the organic insulating layer to form the first protection layers 4 with a same pattern as the electrode connection bridges 3, where the first protection layers 4 are also arranged with via holes matching with the metal bridge points 2, and the shape of the contours of the edges of the first protection layers 4 is the same as the shape of the contours of the edges of the electrode connection bridges 3. In some embodiments, the exposure process of the organic insulating layer and the patterning process of the electrode connection bridges 3 use a same mask; and furthermore a size of the resulting contour of the edge of the first protection layers 4 and a size of the resulting contour of the edge of the electrode connection bridges 3 can be controlled by controlling the amount of exposure so that the size of the contours of the first protection layers 4 is larger than the size of the contours of the electrode connection bridges 3, and thus the edge of the electrode connection bridges 3 are completely covered by the edge of the first protection layers 4.

Figure 13:
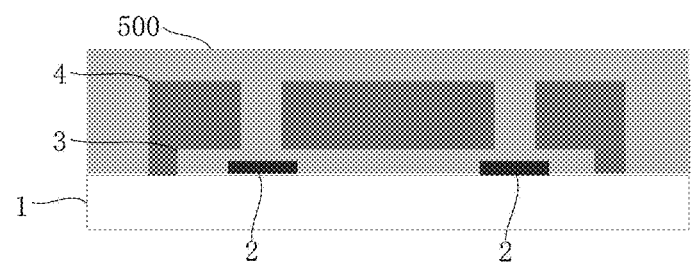
FIG. 13 is a schematic structural diagram of a part of the touch panel in a sectional view according to the embodiments of the disclosure after a second electrode layer is formed.
Figure 14:
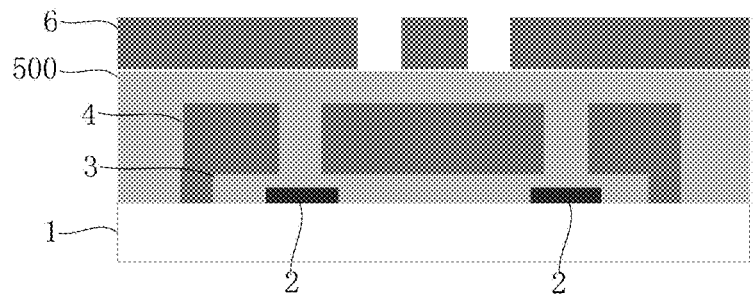
FIG. 14 is a schematic structural diagram of a part of the touch panel in a sectional view according to the embodiments of the disclosure after a second protection layer is formed on the second electrode layer.

In some embodiments, the touch electrodes can be formed on the first organic insulating layer in the step S104 particularly in the following steps:

as illustrated in FIG. 13 and FIG. 14, a second electrode layer 500 is formed on the first organic insulating layer, a second organic insulating layer is formed on the second electrode layer 500, and the second insulating layer is patterned in a same pattern as the touch electrodes to be formed in a fourth patterning process to thereby form the second protection layer 6; and as illustrated in FIG. 4 and FIG. 5, the second electrode layer 500 is etched using the second protection layer 6 as a mask to form the touch electrodes (the first electrode 51 and the second electrode 52).

In some embodiments, the flow of the step S104 can include: forming the integral second electrode layer (ITO layer) 500 on the substrate 1 formed with the bridge structures as illustrated in FIG. 13, and then coating, exposing, and developing the organic insulating layer above the ITO layer 500 to form the pattern of the second protection layer 6, as illustrated in FIG. 14, where the second protection layer 6 is firstly formed; and etching the ITO layer 500 using the second protection layer 6 as a mask so that the ITO layer is removed in an area thereof which is not protected by the second protection layer 6, and reserved in the other area thereof protected by the second protection layer 6, as illustrated in FIG. 4 and FIG. 5, thus forming the structures of the first electrode 51 and the second electrode 52, where the touch electrodes are formed. In the flow above, since the touch electrode layer is etched using the second protection layer 6 instead of photo-resist (PR) as a photo-resist protection layer, the touch electrodes can be formed while dispensing with one mask, and also dispensing with the processes of coating, exposing, developing, and stripping the photo-resist (PR) layer on the ITO layer 500 to thereby simplify the process, and thus avoiding the first protection layer 4 from being partially dissolved while stripping the photo-resist (PR) layer, and consequently the touch electrodes from being peeled.

In some embodiments, after the step S104 above is performed, the method further includes the step of forming a third protection layer with a full layer structure on the second protection layer 6 to thereby isolate the touch electrodes from the air so as to avoid the touch electrodes from being oxidized.

As illustrated in FIG. 6, in some embodiments, the wire protection layer 60 overlying the metal wires 20 can be further formed in the fourth patterning process in the step S104, that is, the pattern of the second organic insulating layer includes the wire protection layer 60 in addition to the second protection layer 6; and furthermore, the second electrode layer 500 is etched using the second organic insulating layer as a mask to form the wire electrode layer 50 overlying the metal wires 20, that is, the pattern of the second electrode 500 includes the wire electrode layer 50 in addition to the touch electrodes.

Optionally as illustrated in FIG. 7, both the wire electrode layer 50 and the wire protection layer 60 are designed with the openings 8 in the bonding area of the metal wires 20, that is, the wire electrode layer 50 and the wire protection layer 60 in the bonding area are etched to expose the metal wires to thereby facilitate circuit connection in the bonding area.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A touch panel, comprising:
   a substrate;
   touch electrodes on the substrate, wherein the touch electrodes comprise a first electrode in a first direction and a second electrode perpendicular to the first direction, and the first electrode comprises a plurality of first electrode blocks; and
   a plurality of bridge structures on the substrate, configured to electrically connect adjacent first electrode blocks of the plurality of first electrode blocks, wherein each of the plurality of bridge structures comprises: at least two metal bridge points, and an electrode connection bridge and a first protection layer overlying the at least two metal bridge points successively, wherein the electrode connection bridge comprises via holes corresponding to the metal bridge points in a one-to-one manner, and a pattern of an orthographic projection of the first protection layer on the substrate has a same shape as a pattern of an orthographic projection of the electrode connection bridge on the substrate; and two of the plurality of first electrode blocks respectively at two ends of each electrode connection bridge run respectively through via holes of the first protection layer and the via holes of the electrode connection bridge, and are electrically connected respectively with the metal bridge points.

2. A method for fabricating the touch panel according to claim 1, comprising:
   forming a metal layer on the substrate, and forming the metal bridge points of each of the plurality of bridge structures in a first patterning process;
   forming a first electrode layer on the metal layer, and forming the electrode connection bridge of each of the plurality of bridge structures in a second patterning process;
   forming a first organic insulating layer on the first electrode layer, and forming the first protection layer of each of the plurality of bridge structures in a third patterning process, wherein a same mask is used in the third patterning process and the second patterning process; and
   forming the touch electrodes on the first organic insulating layer.

3. The method according to claim 2, wherein the forming the touch electrodes on the first organic insulating layer comprises:
   forming a second electrode layer on the first organic insulating layer, forming a second organic insulating layer on the second electrode layer, and patterning the second organic insulating layer in a fourth patterning process to form a same pattern as the touch electrodes to be formed; and
   etching the second electrode layer using the second organic insulating layer as a mask to form the touch electrodes.

4. The method according to claim 3, wherein metal wires are further formed in the first patterning process.

5. The method according to claim 4, further comprising:
   forming a wire protection layer overlying the metal wires in the fourth patterning process; and
   etching the second electrode layer using the second organic insulating layer as a mask to further form a wire electrode layer overlying the metal wires.

6. The method according to claim 3, wherein patterning the second organic insulating layer in a fourth patterning process to form a same pattern as the touch electrodes to be formed comprises:
   patterning the second organic insulating layer in a fourth patterning process to form a same pattern as the touch electrodes to be formed to thereby form a second protection layer;
   wherein etching the second electrode layer using the second organic insulating layer as a mask to form the touch electrodes comprises:
   etching the second electrode layer using the second protection layer as a mask to form the touch electrodes.

7. The method according to claim 6, after forming the touch electrodes on the first organic insulating layer, the method further comprises:
   forming a third protection layer with a full layer structure on the second protection layer.

8. The touch panel according to claim 1, further comprising a second protection layer on the touch electrodes, and a pattern of an orthographic projection of the second protection layer on the substrate coincides with a pattern of an orthographic projection of the touch electrodes on the substrate.

9. The touch panel according to claim 8, further comprising metal wires at a same layer as the metal bridge points.

10. The touch panel according to claim 9, wherein a wire electrode layer at a same layer as the touch electrodes and a wire protection layer at a same layer as the second protection layer overlie the metal wires successively.

11. The touch panel according to claim 10, wherein the wire electrode layer and the wire protection layer each has an opening in a bonding area of the metal wires.

12. The touch panel according to claim 8, further comprising a third protection layer with a full layer structure on the second protection layer.

13. The touch panel according to claim 8, wherein the electrode connection bridge and the touch electrodes are Indium Tin Oxide electrodes, and the first protection layer and the second protection layer are insulating organic layers.

14. A display panel, comprising the touch panel according claim 1.

15. A display device, comprising the display panel according to claim 14.

16. The touch panel according to claim 1, wherein the pattern of the orthographic projection of the first protection layer on the substrate covers the pattern of the orthographic projection of the electrode connection bridge on the substrate.

17. The touch panel according to claim 1, wherein a contour of an edge of the first protection layer completely covers a contour of an edge of the electrode connection bridge.

18. The touch panel according to claim 1, wherein a size of each of the via holes of the first protection layer is less than a size of each of the metal bridge points, and a size of each of the via holes of the electrode connection bridge is less than the size of each of the metal bridge points.

* * * * *